Sept. 12, 1967 D. R. BENNION ET AL 3,341,831

MAGNETIC CORE DEVICE

Filed July 17, 1964 2 Sheets-Sheet 1

INVENTORS
DAVID R. BENNION
WILLIAM K. ENGLISH
BY Samuel Lindenberg

ATTORNEYS

INVENTORS
DAVID R. BENNION
WILLIAM K. ENGLISH
BY Samuel Lindenberg
ATTORNEYS

United States Patent Office 3,341,831

Patented Sept. 12, 1967

3,341,831

MAGNETIC CORE DEVICE

David R. Bennion and William K. English, Menlo Park, Calif., assignors to AMP Incorporated, Harrisburg, Pa., a corporation of New Jersey Filed July 17, 1964, Ser. No. 383,350

9 Claims. (Cl. 340—174)

This invention relates generally to magnetic core devices and more particularly to an improved magnetic core structure finding significant utility in shift registers and other logical circuits.

Various magnetic core shift register configurations are well known in the prior art. Generally, each configuration includes one stage per bit of storage capacity and each stage includes a pair of storage devices. Thus, several known shift register configurations employ two multiaperture magnetic cores per stage, which cores respectively perform input and output functions. For example, information can be initially stored in the input cores of each stage and during a first clock phase the information can be transferred to the output core of the same stage. During a second clock phase, the input core can be cleared. During a third clock phase, the information can be transferred from the output core of each stage to the input core of the succeeding stage and during a fourth clock phase, the output cores can be cleared.

The cost of providing a shift register of the generally described type is high both because multiaperture cores are relatively expensive and more significantly, because of the cost of wiring the cores. Consequently, many attempts have been made to design discrete multiaperture cores which can effectively perform both the input and the output functions and thus replace the two cores per stage normally required.

Accordingly, it is an object of the present invention to provide a magnetic core structure suitable for use in a one-core-per-stage magnetic core shift register.

It is an additional object of the present invention to provide a magnetic core shift register which is less costly than previously known shift registers having comparable operational characteristics.

In accordance with the invention, a multiaperture magnetic core is provided which includes an input section, a buffer section, and an output section. The buffer section defines a closed minor magnetic flux path which includes a first portion in common with a closed magnetic flux path defined by the input section and a second portion in common with a closed magnetic flux path defined by the output section. The buffer section is capable of selectively isolating the input and output sections so that flux switched in the input section is prevented from affecting the output section and vice versa. Thus, information can be simultaneously read from the output section and stored in the input section. The buffer section can however be switched to a non-isolating or prime state and thereby effectively transfer the information stored in the input section to the output section. Operation of the core requires the definition of only three clock phases; namely a first phase to store information in the core input section and to read information from the core output section, a second phase to prime the core and transfer information from the input to output section, and a third phase to clear the input section.

The novel features that are considered characteristic of this invention are set forth with particularity in the appended claims. The invention itself both as to its organization and method of operation, as well as additional objects and advantages thereof, will best be understood from the following description when read in connection with the accompanying drawings, in which:

FIGURE 1(*a*) is a schematic diagram of a preferred embodiment of a magnetic core device constructed in accordance with the present invention illustrating the windings coupled thereto and the flux orientation therein defining a clear state;

FIGURES 1(*b*) through 1(*e*) are schematic diagrams of the magnetic core of FIGURE 1(*a*) respectively illustrating the flux orientations thereof set up in response to the pulses applied to the set, prime, internal advance, and external advance windings coupled thereto;

Figure 1A:
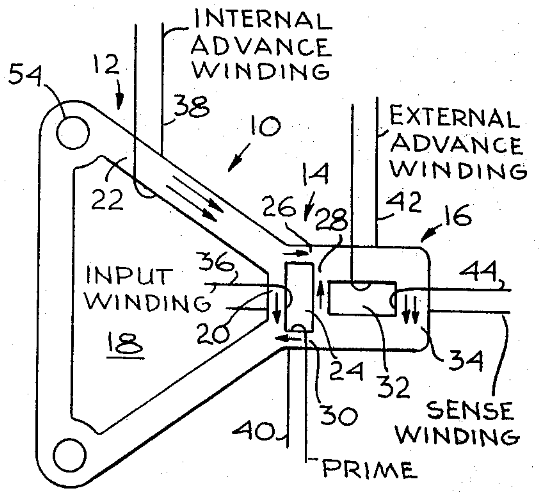
Figure 1B:
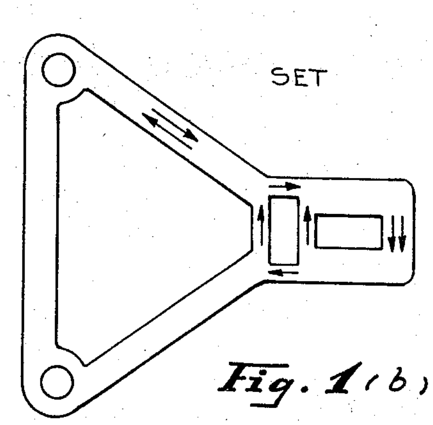
Figure 1C:
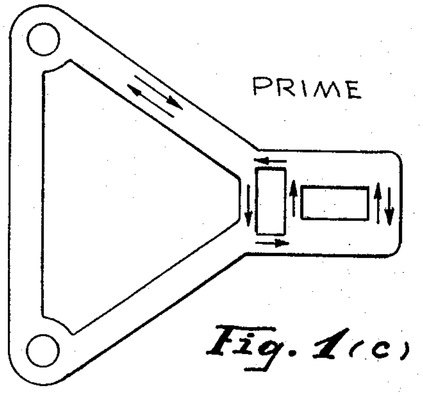
Figure 1D:
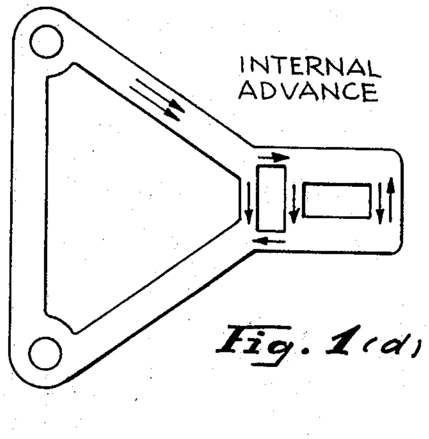
Figure 1E:
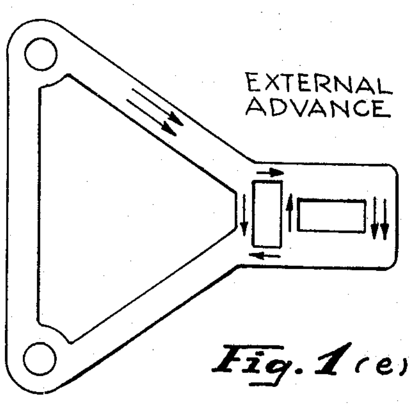

Attention is now called to FIGURE 1(*a*) of the drawings which illustrates a magnetic core 10 constructed in accordance with the present invention. The core 10 is preferably formed of a homogeneous ferromagnetic material of uniform thickness. The core may be considered as being comprised of an input section 12, a buffer section 14 and an output section 16.

The input section 12 includes a first large substantially triangularly-shaped aperture 18 surrounded by a closed magnetic flux path including a minor portion 20 having a unit cross-sectional area and a major portion 22 having a cross-sectional area substantially equal to twice that of the minor portion 20.

The buffer section 14 includes a substantially rectangular aperture 24 surrounded by a closed magnetic flux path including, in addition to previously mentioned portion 20, portions 26, 28, and 30. Portions 26, 28, and 30 have a unit cross-sectional area substantially equal to that of portion 20.

The output section 16 includes a substantially rectangular aperture 32 also surrounded by a closed magnetic flux path including, in addition to the minor portion 28, a major portion 34 having a cross-sectional area equal to substantially twice that of the minor portion 28. It should be appreciated that when the material of core 10 is saturated, substantially twice the number of flux lines exist in the major portions than exist in the minor portions. For simplicity in explanation, each of the major portions will be illustrated herein as having two flux lines (represented by the arrows) and all of the minor portions as having a single flux line.

An input winding 36 is coupled to the minor portion 20 of the input section closed flux path. An internal advance winding 38 is coupled to the major portion 22 of the input section closed flux path. A prime winding 40 is coupled to the minor portion 30 of the buffer section closed flux path. An external advance winding 42 is coupled to the major portion 34 of the output section closed flux path. Similarly, a sense winding 44 is coupled to the major portion 34 of the output section closed flux path.

Let it be assumed that the magnetic flux orientation, represented by the arrows in FIGURE 1(*a*), represents a "clear" or binary "0" state. In order to switch the core to a "set" or binary "1" state, a current pulse 46 can be applied to the input winding 36 to switch the flux in the minor portion 20 to the opposite orientation. Inasmuch as the flux in portions 26 and 30 are already saturated in a clockwise direction around aperture 24, half of the flux in the major portion 22 of the input section 18 will reverse. FIGURE 1(*b*) indicates the magnetic flux orientation after the application of a set pulse to the input winding 36. Subsequent to the development of the set pulse 46, a pulse 48 can be applied to the prime winding 40 to switch the flux orientation in the portions 20, 26, and 30 of the buffer section 14 and a portion of the flux in the major portion 34 of the output section 16. Spurious flux switching in the major portion 22 of the input section 12 can be avoided if the pulse applied to the prime winding is a relatively long amplitude limited pulse. The flux orientation within the core 10 after the prime operation is illustrated in FIGURE 1(*c*). It should be noted that whereas the state of the buffer section 14 isolated the output section 16 from the input section 12 when the set pulse 46 was developed, the prime pulse effectively transfers the set state of the input section 12 to the output section 16.

Subsequently, a pulse 50 is applied to the internal advance winding 38 to establish a clear state around the aperture 18. Note that the reorientation of the flux around the aperture 18 reorients the flux in portions 26, 28, and 30 in a clockwise direction around the aperture 24. No flux switches in portion 20 since that portion had already been cleared by the priming operation. In response to the internal advance pulse 50, the flux reverses in portion 28 rather than portion 34 of the output section 16 due to both the sense winding loading on portion 34 and the shorter length flux path through portion 28.

A pulse 52 can subsequently be applied to the external advance winding 42 to switch the flux in portions 28 and 34 of the output section to the clear state and in so doing, will induce an output pulse in the sense winding 44.

Thus, it should be appreciated how a binary "1" can be set into the input section 12 of the core and transferred to the output section 16 to develop an output pulse indicative of the stored binary information. It should be noted that inasmuch as the flux around the aperture 18 is cleared prior to the application of the pulse to the external advance winding, the input section 12 can be set simultaneously with the information being read from the output section.

If the set pulse 46 is not applied to the input winding 36, then the core remains in a clear state and the prime, internal advance and external advance pulses have no effect (assuming of course that the amplitude of the prime pulse is properly limited). The amplitudes of the internal and external advance pulses must be greater than a certain minimum threshold, but their maximum value is not significant.

It has been mentioned that an amplitude-limited current should be applied for a relatively long period to the prime winding 40 in order to prevent spurious flux switching around the aperture 18. The range of the current applied to the winding 40 can be increased by utilizing a winding 41 of the type shown in FIGURE 3 in lieu of the winding 40 shown in FIGURE 1(*a*). The winding 41 includes two serially related portions which are respectively coupled to the major portion 22 of the input section and the portion 30 of the buffer section. The winding 41 is oriented so that the winding portion on the major path portion 22 opposes the effect of the winding portion on the buffer section to consequently reduce the effects of a higher amplitude current applied to the prime winding. Thus, a current applied to the prime winding 41 tends to orient the flux in the buffer section portion 30 to the right. The portion of the prime winding 41 coupled to the input section tends to keep flux oriented in a clockwise direction around the aperture 18 thereby inhibiting the possibility that an excessive current in the prime winding applied to the buffer section will spuriously switch flux around the aperture 18 in a counterclockwise direction.

Figure 3:
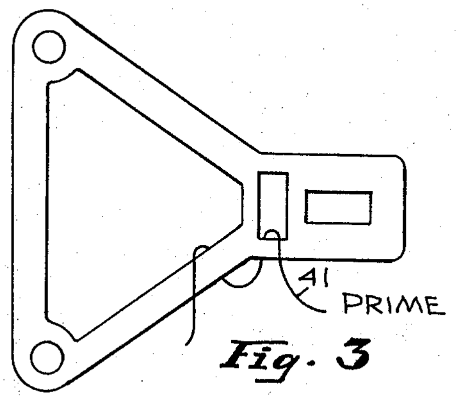
FIGURE 3 is a schematic diagram of the core of FIGURE 1(*a*) illustrating an alternative prime winding arrangement.
Figure 4:
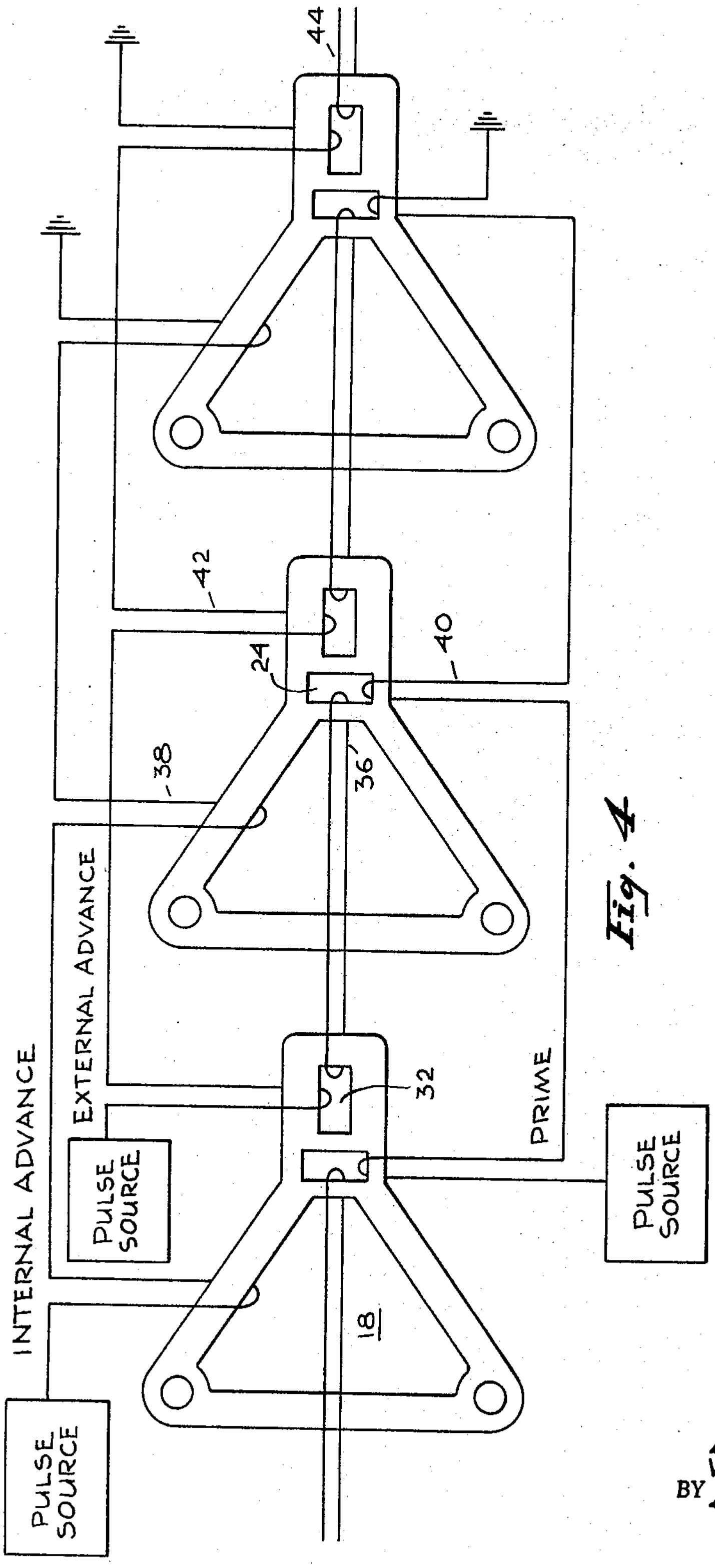
FIGURE 4 is a schematic diagram of a portion of a shift register employing magnetic cores constructed in accordance with the present invention.
Figure 2:
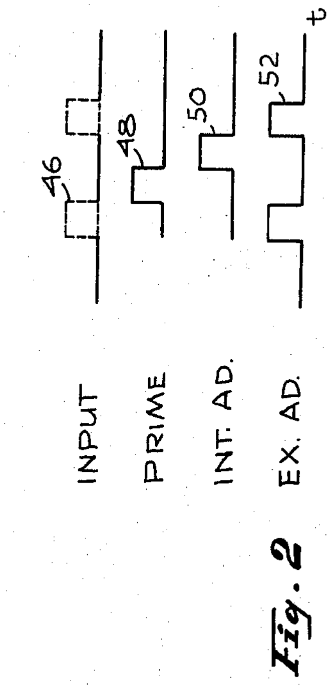
FIGURE 2 is a timing chart illustrating the time relationship between pulses applied to the windings of FIGURE 1(*a*)

Attention is now called to FIGURE 4 which illustrates a portion of a shift register including three stages, each stage being comprised of a magnetic core of the type shown in FIGURES 1 and 3. From what has been said thus far, it should be apparent that when a binary "1" is stored in any of the core input sections, it will be transferred to a succeeding core during the three phases of the succeeding drive cycle.

From the foregoing, it should be apparent that an improved magnetic core device has been disclosed herein which finds particular utility in magnetic core shift registers inasmuch as it permits a discrete core to be utilized in lieu of the two cores per stage generally employed in prior art shift registers. The illustrated magnetic core represents what is considered to be the preferred embodiment of the invention. However, it should be recognized by those skilled in the art that structural variations can be made in the illustrated core without departing from the teachings of the invention. For example, the core could be constructed with the input section having a rectangular aperture.

Although what is probably the most significant application of the core, i.e. in a shift register, has been specifically mentioned herein, it is pointed out that the core can be utilized in many other circuit configurations where information transfer between cores has to be effected. Thus, the invention finds significant utility in many types of logic circuits which formerly have employed a pair of cores effectively performing input and output functions of the aforedescribed type. Further, as is well known in the art, apertures 54 can be provided in the input section flux path to permit the core to be read non-destructively inasmuch as an output signal will be induced in a winding through the aperture when the core is in a set state and the pulse is applied to the internal advance winding.

What is claimed is:

1. A discrete information storage device comprising an input section including means defining a closed magnetic flux path comprised of serially related major and minor flux portions; an output section including means defining a closed magnetic flux path comprised of serially related major and minor flux portions; and a buffer section including means defining a minor closed magnetic flux path including said input and output section minor flux portions.

2. A magnetic core device defining a first aperture having a first closed magnetic flux path formed therearound, said first flux path including a major and a minor portion; a second aperture having a second closed magnetic flux path formed therearound, said second flux path including a major and a minor portion; and a third aperture having a third closed magnetic flux path formed therearound, said third flux path positioned between and contiguous with said first and second flux paths and including said first and second flux path minor portions.

3. The device of claim 2 including first winding means selectively energizable for establishing a set magnetic flux state in said first path; second winding means subsequently energizable to establish a prime magnetic flux state in said second and third paths in response to said set state in said first path; third winding means subsequently energizable for reorienting the flux in each of said paths to establish a clear magnetic flux state in said core; and sense winding means responsive to the flux reorientation in said second path.

4. A magnetic core device defining a first closed magnetic flux path including a minor portion having a unit cross-sectional area and a major portion having a cross-sectional area substantially twice that of said minor portion; a second closed magnetic flux path including a minor portion having a unit cross-sectional area and a major portion having a cross-sectional area substantially twice that of said minor portion; a third closed magnetic flux path having a unit cross-sectional area positioned between and contiguous with said first and second flux paths and including said first and second flux path minor portions.

5. The magnetic core device of claim 4 including an input winding coupled to said first flux path minor portion; a prime winding coupled to said third flux path; an internal advance winding coupled to said first flux path major portion; an external advance winding coupled to said second flux path major portion; and a sense winding coupled to said second flux path major portion.

6. The device of claim 5 including means for initially energizing said external advance winding to orient the magnetic flux in said first and second paths to establish a clear state; means for subsequently selectively energizing said input winding to reorient the flux in said first path to establish a set state; means for subsequently energizing said prime winding to reorient the flux in said second and third flux paths to establish a prime state; means for subsequently energizing said internal advance winding to reorient the flux in said first and third paths; and means for subsequently energizing said external advance winding to reorient the flux in said second flux path to thereby induce an output signal in said sense winding and to establish said clear state.

7. The magnetic core device of claim 5 wherein said prime winding is additionally coupled to the major portion of said first flux path.

8. A shift register including a plurality of stages, each of said stages being comprised of a discrete magnetic core having an input section, an output section and a buffer section; each of said input sections including means defining a closed magnetic flux path comprised of serially related major and minor flux portions; each of said output sections including means defining a closed magnetic flux path comprised of serially related major and minor flux portions; and each of said buffer sections including means defining a minor closed magnetic flux path including said input and output section minor flux portions.

9. The register of claim 8 wherein each of said stages includes an input winding coupled to said input section magnetic flux path and an output winding coupled to said output section magnetic flux path; an internal advance winding coupled to said input section magnetic flux path; a prime winding coupled to said buffer section magnetic flux path; an external advance winding coupled to said output section magnetic flux path; and means coupling each of said output windings to the input winding of a succeeding stage.

No references cited.

BERNARD KONICK, *Primary Examiner.*

P. SPERBER, *Assistant Examiner.*